US008802024B2

(12) United States Patent
Tseng et al.

(10) Patent No.: US 8,802,024 B2
(45) Date of Patent: Aug. 12, 2014

(54) BIOCHIP AND MANUFACTURING METHOD THEREOF

(75) Inventors: Fan Gang Tseng, Hsinchu (TW); Hsin Yi Hsieh, Taipei County (TW); Chun Lung Wu, Taipei (TW)

(73) Assignee: National Tsing Hua University, Hsinchu (TW)

( * ) Notice: Subject to any disclaimer, the term of this patent is extended or adjusted under 35 U.S.C. 154(b) by 990 days.

(21) Appl. No.: 11/864,164

(22) Filed: Sep. 28, 2007

(65) Prior Publication Data

US 2008/0220989 A1    Sep. 11, 2008

(30) Foreign Application Priority Data

Mar. 7, 2007    (TW) ................................ 96107777 A (51) Int. Cl.
*B01J 19/00* (2006.01)
*B05D 5/00* (2006.01)
*B05D 1/38* (2006.01)
*C40B 60/10* (2006.01)

(52) U.S. Cl.
USPC .......... 422/426; 422/68.1; 435/6.11; 435/7.1; 435/7.9; 435/287.2; 436/524; 436/527; 436/528; 506/15; 506/16; 506/18; 506/23; 506/30; 506/32; 506/38; 506/39; 427/2.11; 427/2.13

(58) Field of Classification Search
None
See application file for complete search history.

(56) References Cited

U.S. PATENT DOCUMENTS

| | | | |
|---|---|---|---|
| 6,475,809 B1 * | 11/2002 | Wagner et al. | 422/68.1 |
| 6,508,988 B1 * | 1/2003 | Van Dam et al. | 422/102 |
| 6,545,758 B1 * | 4/2003 | Sandstrom | 356/317 |
| 2002/0150683 A1 * | 10/2002 | Troian et al. | 427/256 |
| 2003/0017508 A1 * | 1/2003 | Charych et al. | 435/7.9 |
| 2004/0110276 A1 * | 6/2004 | Amontov et al. | 435/287.2 |
| 2005/0079598 A1 * | 4/2005 | Davis | 435/287.1 |
| 2005/0107528 A1 * | 5/2005 | Dockery et al. | 525/54.1 |
| 2008/0253928 A1 * | 10/2008 | Goshoo et al. | 422/68.1 |
| 2009/0028910 A1 * | 1/2009 | DeSimone et al. | 424/401 |

OTHER PUBLICATIONS

Swerdya-Krawiec, Beata, Halagower Devaraj, George Jacob, and James J. Hickman. "A New Interpretation of Serum Albumin Surface Passivation" Langmuir, vol. 20, No. 6, (2004): [Accessed on Feb. 22, 2010 from Google Scholar].*

* cited by examiner

*Primary Examiner* — Jill Warden
*Assistant Examiner* — Timothy G Kingan
(74) *Attorney, Agent, or Firm* — Muncy, Geissler, Olds & Lowe, P.C.

(57) ABSTRACT

A method for manufacturing a biochip is provided. First, a first self-assembled monolayer is coated on a substrate. Next, a plurality of first biomedical molecular dots are formed on the first self-assembled monolayer by micro-titration technique. After the bonding reaction between the first biomedical molecular point and the first self-assembled monolayer, a second self-assembled monolayer is deposited on the surface of the first self-assembled monolayer by evaporation. The second self-assembled monolayer attached on the plurality of first biomedical molecular dots and the first self-assembled monolayer not bonded to the substrate are removed, so that the first biomedical molecular dots immobilized on the first self-assembled monolayer are exposed. Finally, a second biomedical molecular layer is immobilized on the exposed portions of the first biomedical molecular dots.

6 Claims, 12 Drawing Sheets

BIOCHIP AND MANUFACTURING METHOD THEREOF

BACKGROUND OF THE INVENTION

1. Field of the Invention

The present invention relates to a biochip and a manufacturing method thereof. More particularly, the present invention relates to a micro-array biochip with dot array patterned reagents and a manufacturing method thereof, and especially to a method for forming a biochip with a bonding barrier layer by vapor deposition.

2. Description of the Related Art

The term microarray biochip refers to a substrate with a plurality of various reagents immobilized on the surface. Suitable materials of the substrate can be glass, silicon chip, nylon film, or polymer. These reagents (also called probes) are usually designed according to the specificity or other active characteristics, for example, binding affinity, being complementary to biological samples (i.e. subjects), and so on. Under actual experimental conditions, a biological sample is added to the substrate on which probes are fixed, and simultaneously the probes on the substrate react with the subjects in the biological sample by hybridization. By detection and analysis using various marking systems and specific instruments, information on the quality and quantity of the subjects related to the tested biological sample is obtained.

In the conventional biochip technique, a commonly used bonding barrier material is bioserum albumin, such as horse serum albumin and bovine serum albumin, which is used to block various binding of the excess biomedical molecules and the surface at the non-detected locations, so as to reduce background noise, and thereby achieve the purpose of enhancing the detection sensitivity. Taking fluoroimmunoassay as an example, when bioserum albumin is used as the bonding barrier in the fluoroimmunoassay, the bioserum albumin is added as a bonding barrier layer on the chip with a plurality of first biomedical molecular dots arranged thereon. Therefore, subsequent biomedical molecules subsequently overlaid on the biochip are prevented from binding to the surfaces of the biochip without the first layer of biomedical molecules through non-specific bonding (binding for non-specific identification), such that they serve as the barrier layer to reduce the effect of the background fluorescence, thereby improving the S/N ratio of the fluorescence detection.

Figure 1A:
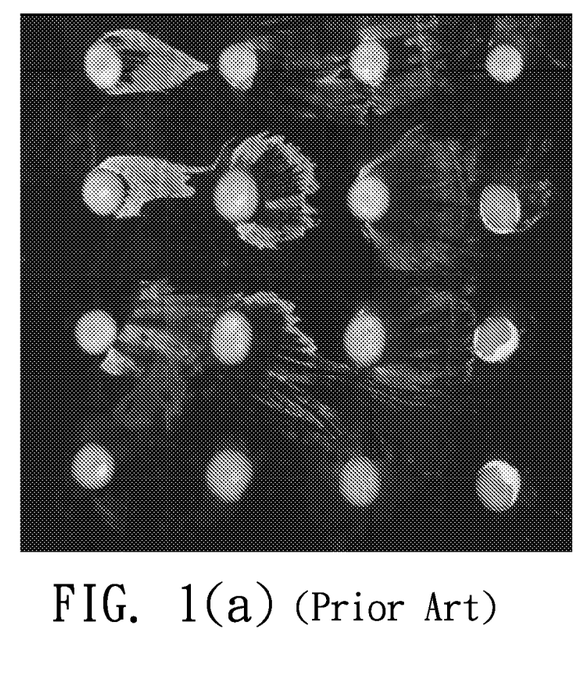
FIG. 1(a) is a diagram showing a fluorescence scanning image after a bonding barrier layer of bioserum albumin is formed on a biochip through liquid soakage.

FIG. 1(a) is a diagram showing a fluorescence scanning image after a bonding barrier layer of bioserum albumin is formed on a biochip through liquid soakage. The black shown in the background confirms that the bioserum albumin effectively eliminates the background value caused by the non-specific fluorescence signals. However, since the overlaid bonding barrier layer is formed by liquid soakage, the previous first layer of biomedical molecular dots will be dispersed by the liquid. Therefore, a part of the background noise is raised, and the signal points are blurred and dispersed. Additionally, in the detection step, in order to rinse the excess and non-bonded protein, it is necessary to use a buffer solution with a surfactant to rinse the biochip, so that the tailing phenomenon will easily occur at the moment of rinsing with liquid, and other signal points will be contaminated. Therefore, although the biochip with bioserum albumin as bonding barrier has a higher S/N ratio than the biochip without bonding barrier, the biochip with bonding barrier will present an inferior fluorescence scanning image due to the tailing or blurring, as shown in FIG. 1(a).

Figure 1B:
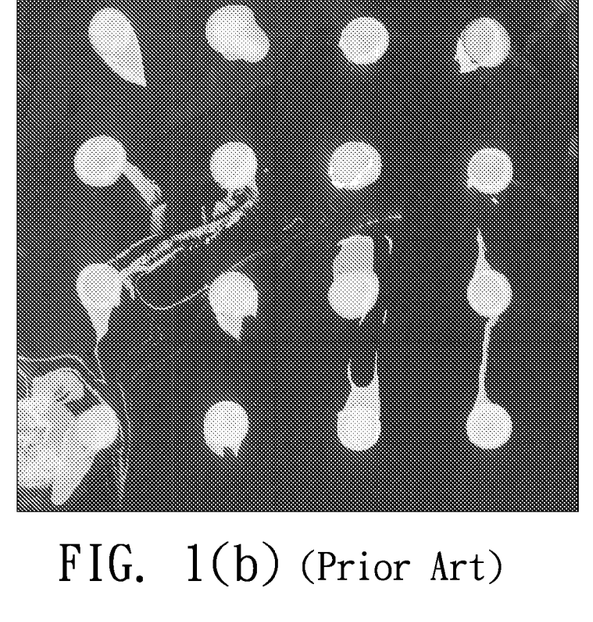
FIG. 1(b) is a fluorescence scanning image in which no bonding barrier material is used, compared with FIG. 1(a)

Furthermore, the conventional bioserum albumin is easily attached on the surface of the first layer of biomedical molecules, so that the ability of the second layer of biomedical molecules to identify the first biomedical molecular layer is blocked. Thus, the practical value of the detection signal is less than expected. Therefore, by comparing the results of fluorescence signals in FIG. 1(a) (in which a bioserum albumin is used as bonding barrier material) and those in FIG. 1(b) (which use no bonding barrier material), it can be clearly observed that the green and red fluorescence signals at the round points are low (the overlap of red and green fluorescence produces yellow). That is to say, the bioserum albumin bonding barrier material and the first biomedical molecular layer are adhered to each other, so that the green fluorescence signal for labeling the first biomedical molecular layer is reduced. Consequently, the undesired adherence as shown in FIG. 1(a) also reduces the identification binding rate of the second biomedical molecular layer, so that the red fluorescence signal for labeling the second biomedical molecular layer becomes low in comparison with the first biomedical molecular layer without bonding barrier (FIG. 1(b)).

Figure 2A:
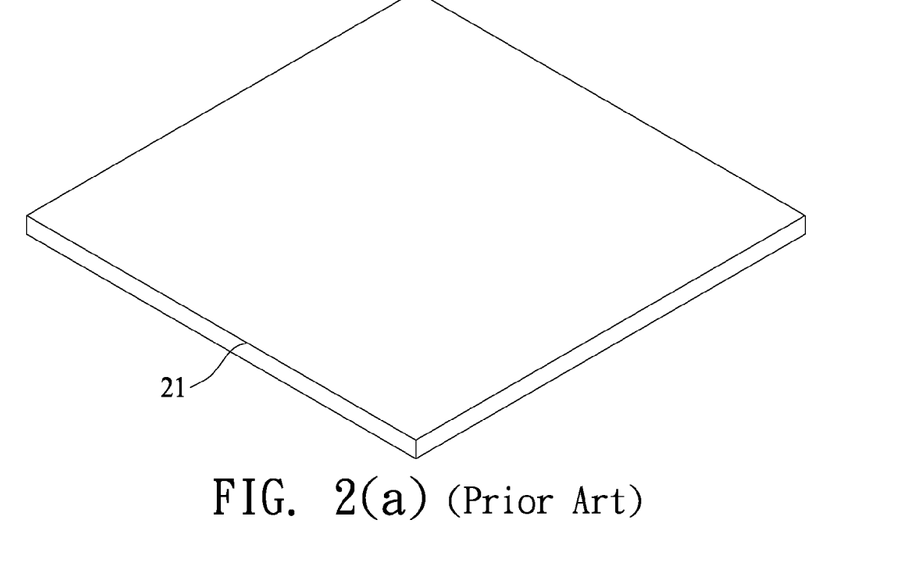
FIGS. 2(a)-2(i) are diagrams of respective steps for forming a biochip with a bonding barrier of bioserum albumin through liquid soakage.
Figure 2B:
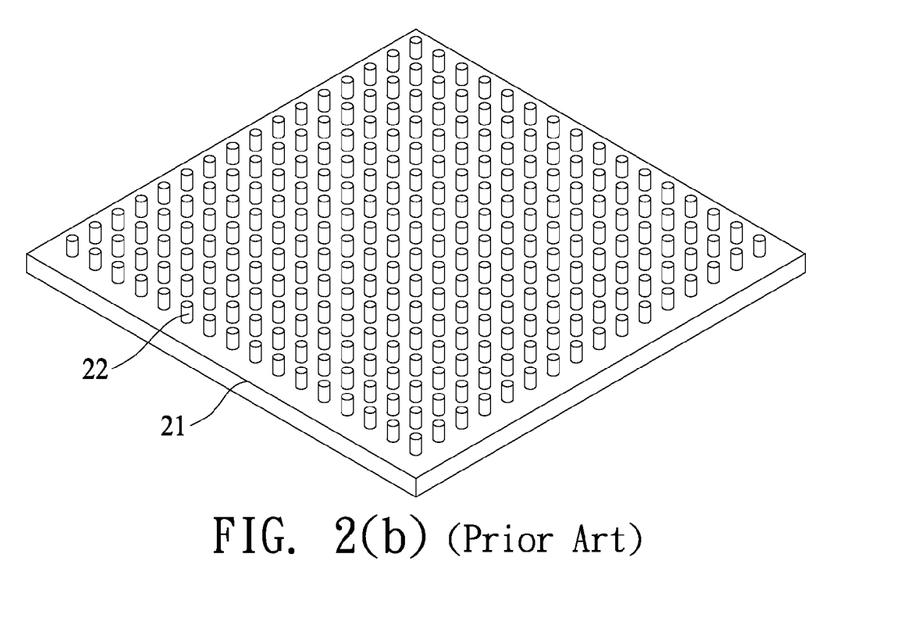
Figure 2C:
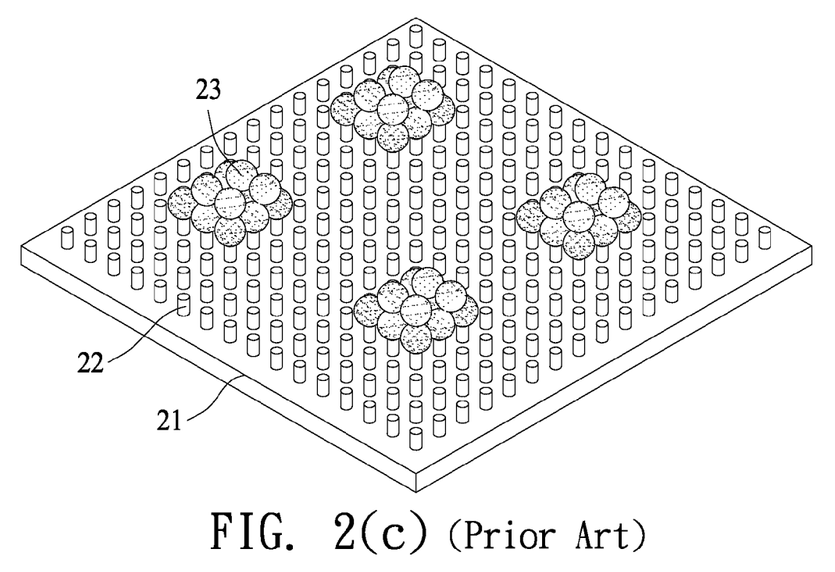
Figure 2D:
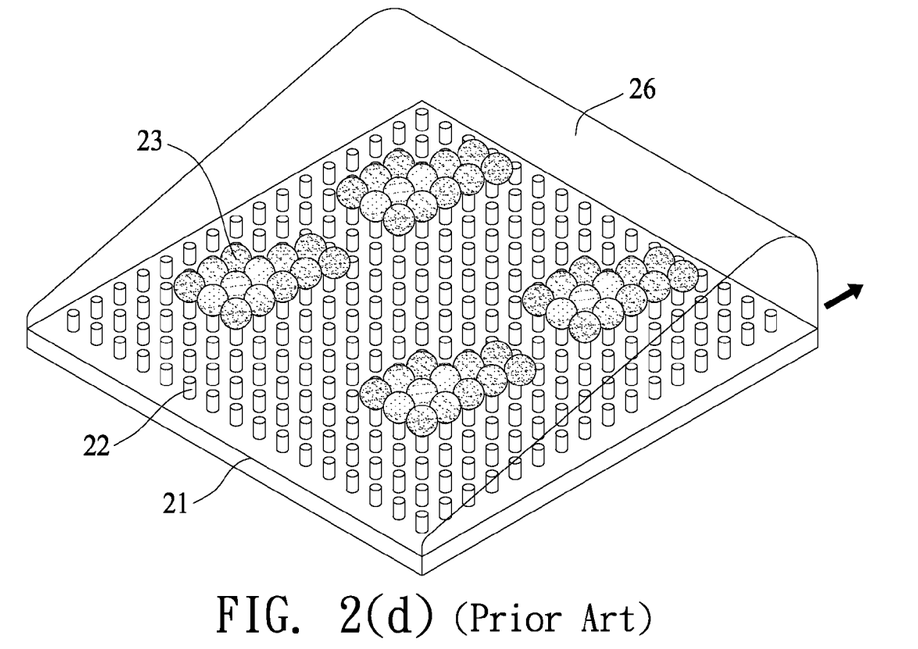
Figure 2E:
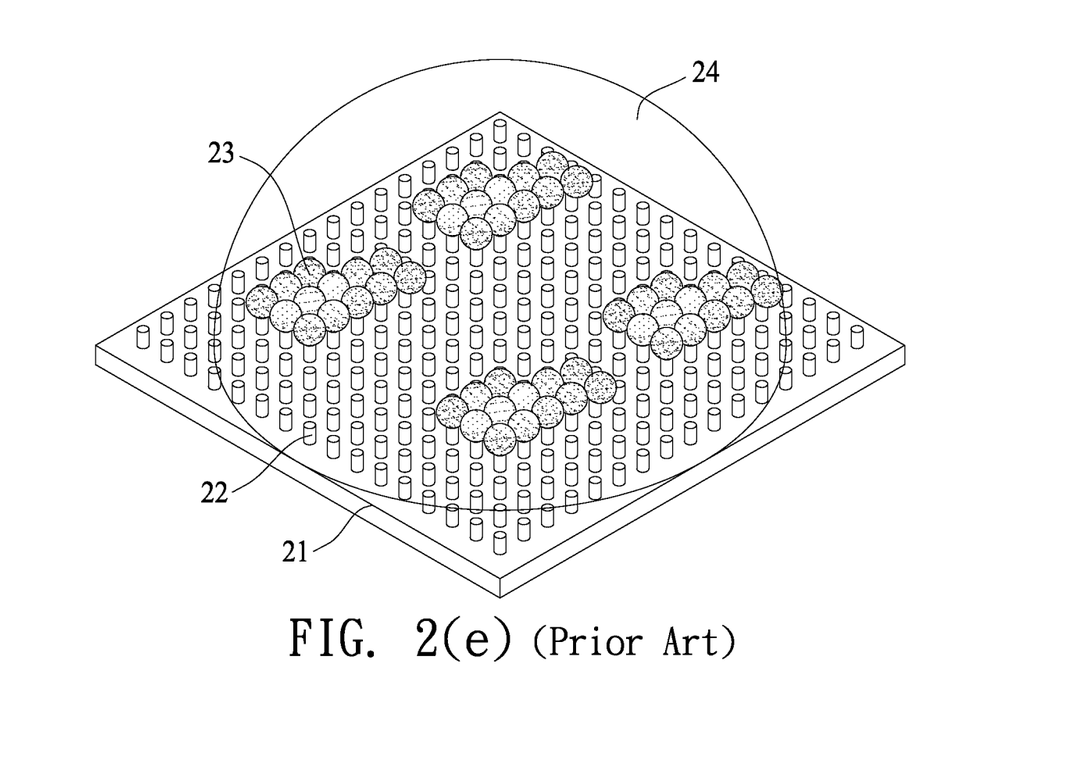
Figure 2F:
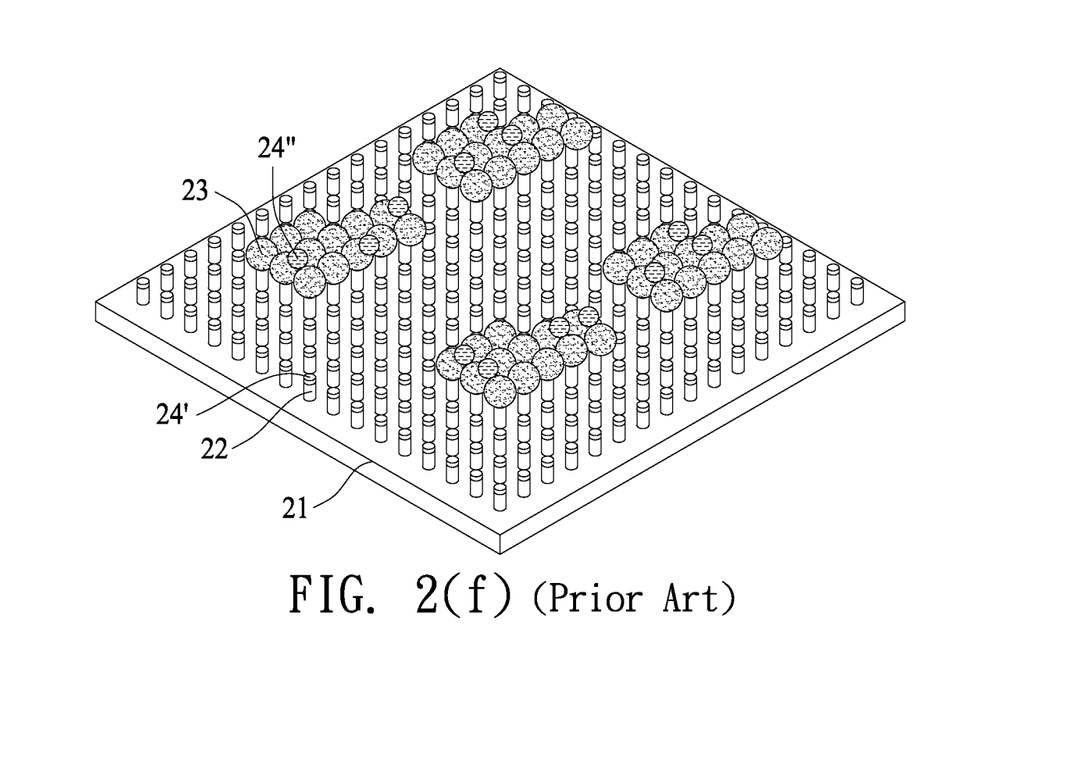
Figure 2G:
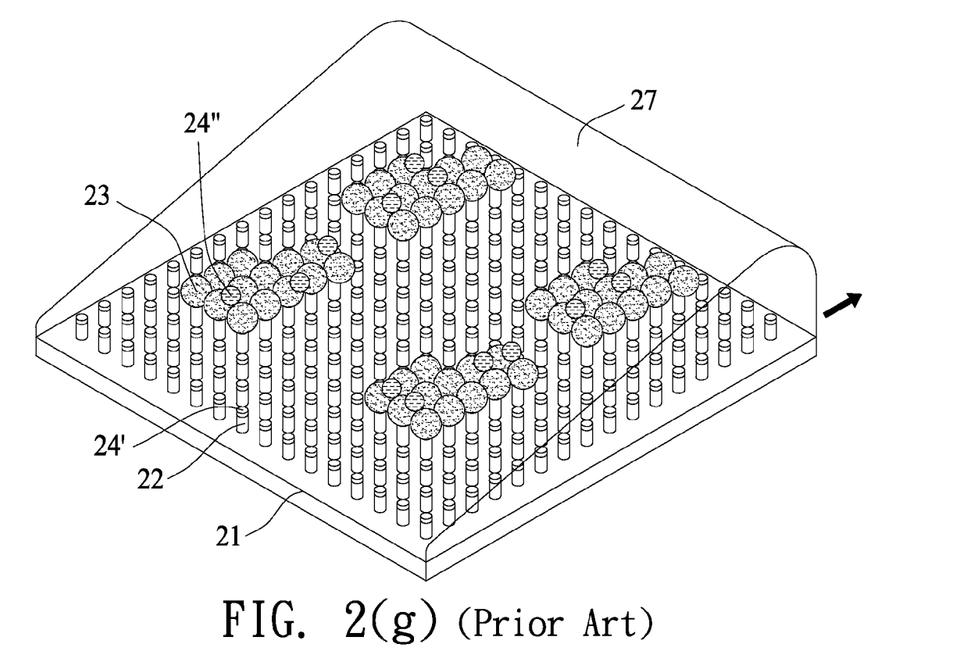
Figure 2H:
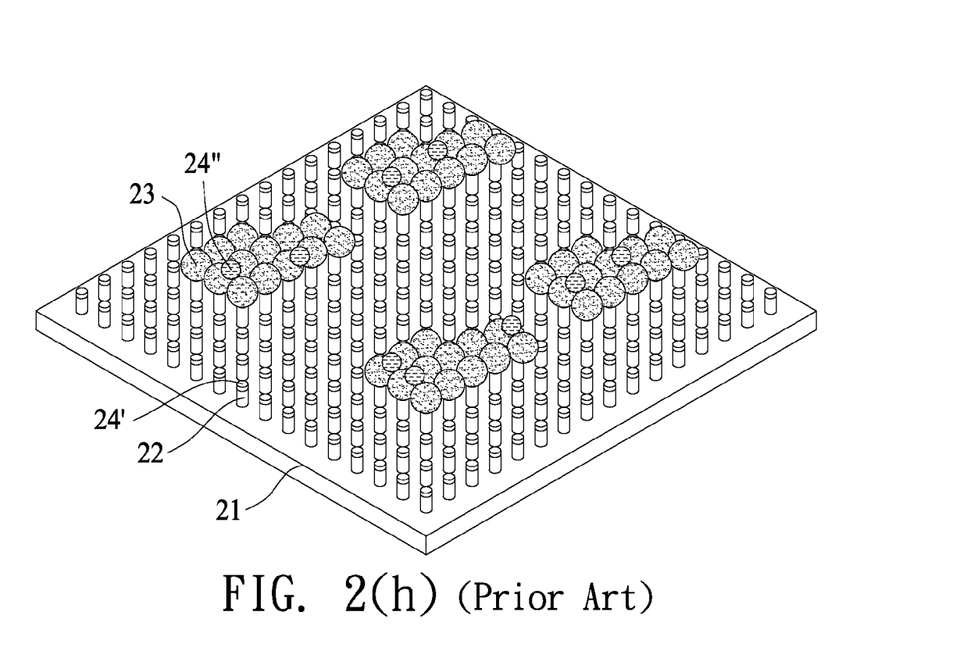
Figure 2I:
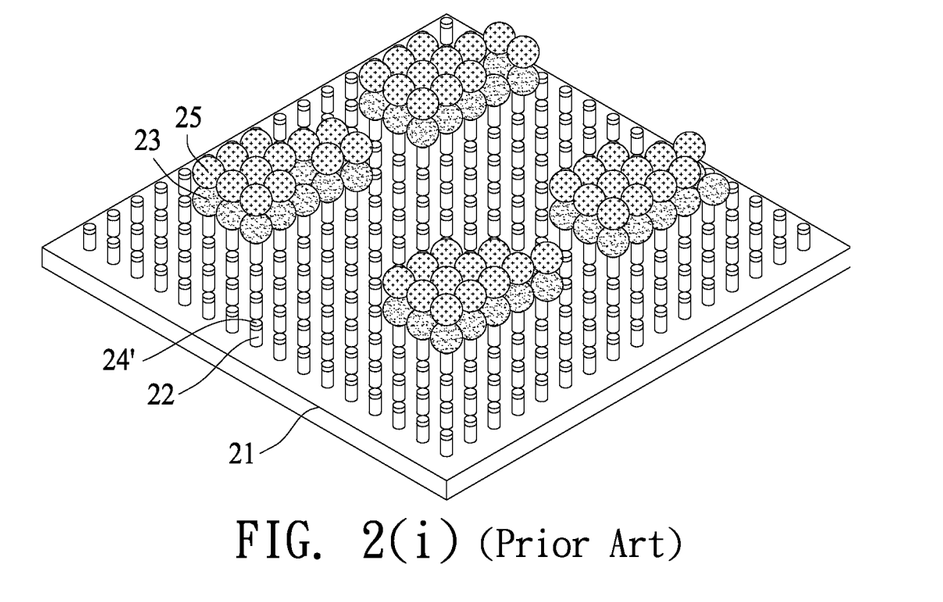

FIGS. 2(a)-2(i) are diagrams of respective steps for forming a biochip with a bonding barrier of bioserum albumin through liquid soakage. As shown in FIGS. 2(a) and 2(b), a cleaned substrate 21 or a slide is soaked in a liquid to form a self-assembled monolayer 22 thereon, for example, a layer of (3-aminopropyl)trimethoxysilane (APTS). Then, an excess first biomedical molecular layer 23 is dropped on the substrate 21 by a micropipette (as shown in FIG. 2(c)). After the first biomedical molecular layer 23 and the self-assembled monolayer 22 on the substrate 21 are sufficiently combined through bonding reaction, the excess portion of the first biomedical molecular layer 23 is rinsed out by a liquid 26, but the tailing phenomenon occurs in each point of the first biomedical molecular layer 23, as shown in FIG. 2(d). A bioserum albumin 24 capable of being a bonding barrier is then dropped (as shown in FIG. 2(e)), and the bioserum albumin 24' is uniformly distributed on the surface of the self-assembled monolayer 22 with a cover glass. The portion of the self-assembled monolayer 22 without the first biomedical molecular layer 23 dropped thereon is subjected to bonding barrier processing, as shown in FIG. 2(f). Referring to FIG. 2(g), the excess bioserum albumin 24" serving as a bonding barrier is rinsed away with a liquid 27. Since the adherence still exists between a part of the bioserum albumin and the first biomedical molecular layer 23 after the aforesaid rinse (as shown in FIG. 2(h)), the identification rate is reduced when the first biomedical molecular layer 23 is identified by a second biomedical molecular layer 25 (as shown in FIG. 2(i)) and the second biomedical molecular layer 25 is blocked by the bioserum albumin 24" which is adhered to the surface of the first biomedical molecular layer 23.

In view of the foregoing, there is a need for a method to improve the bonding barrier effect in manufacturing the biochip, so as to avoid various disadvantages resulting from the conventional bioserum, to further improve the detection efficacy and shorten the manufacturing process time, and to benefit from the advantages of batch processing.

SUMMARY OF THE INVENTION

An objective of the present invention is to provide a biochip and a manufacturing method thereof, in which a self-assembled monolayer's material different from the conventional bioserum albumin serves as a bonding barrier material, so that the detection efficacy can be improved and the time of the manufacturing process can be shortened, thereby providing the advantages of batch processing.

In order to achieve the objective, the present invention discloses a method for manufacturing a biochip. Firstly, a first self-assembled monolayer is coated on a substrate surface. Next, a plurality of first biomedical molecular dots is formed on the first self-assembled monolayer by micro-droplet technique. After the bonding reaction between the first biomedical molecules and the first self-assembled monolayer, a second self-assembled monolayer is formed on a surface of the first self-assembled monolayer by vaporization deposition. Afterward, the second self-assembled monolayer adhered to the plurality of first biomedical molecular dots and the non-bonded first self-assembled monolayers are removed, so that the first biomedical molecular layer immobilized on the surface of the first self-assembled monolayer is exposed. Finally, a second biomedical molecular layer is immobilized on the exposed surface of the first biomedical molecular layer.

The present invention further discloses a biochip, which includes a substrate, a self-assembled monolayer, a plurality of first biomedical molecular dots and a non-biological self-assembled monolayer. The self-assembled monolayer is bonded on the substrate surface. Also, the plurality of first biomedical molecules is immobilized in the form of dot arrays on the surface of the self-assembled monolayer. The non-biological self-assembled monolayer is disposed on the portions of the surface of the self-assembled monolayer which are not covered by the plurality of first biomedical molecular dots.

BRIEF DESCRIPTION OF THE DRAWINGS

The invention will be described according to the appended drawings in which.

PREFERRED EMBODIMENT OF THE PRESENT INVENTION

The accompanying drawings are included to provide a further understanding of the invention, and to explain the technical features of the invention clearly.

Figure 3A:
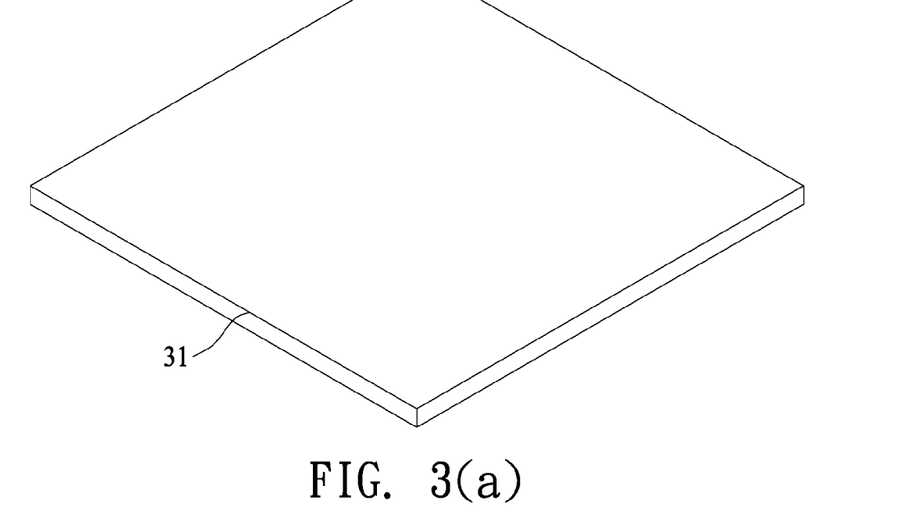
FIGS. 3(a)-3(h) are diagrams of respective steps for forming a biochip with a bonding barrier by vapor deposition in accordance with the present invention.
Figure 3B:
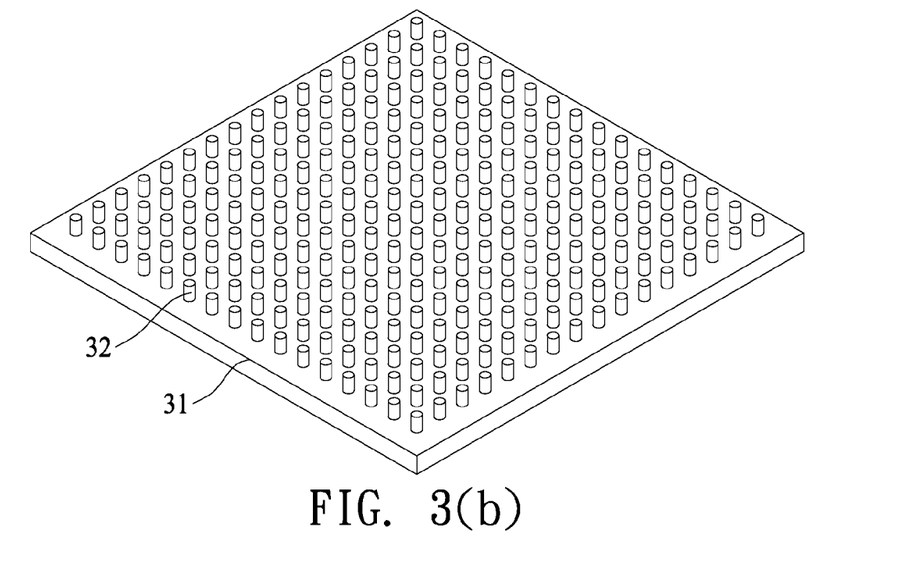
Figure 3C:
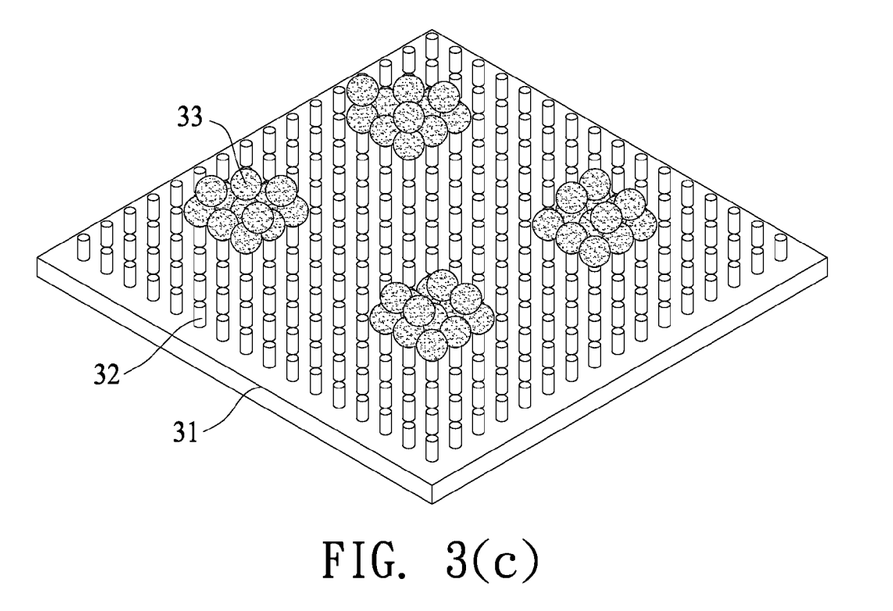
Figure 3D:
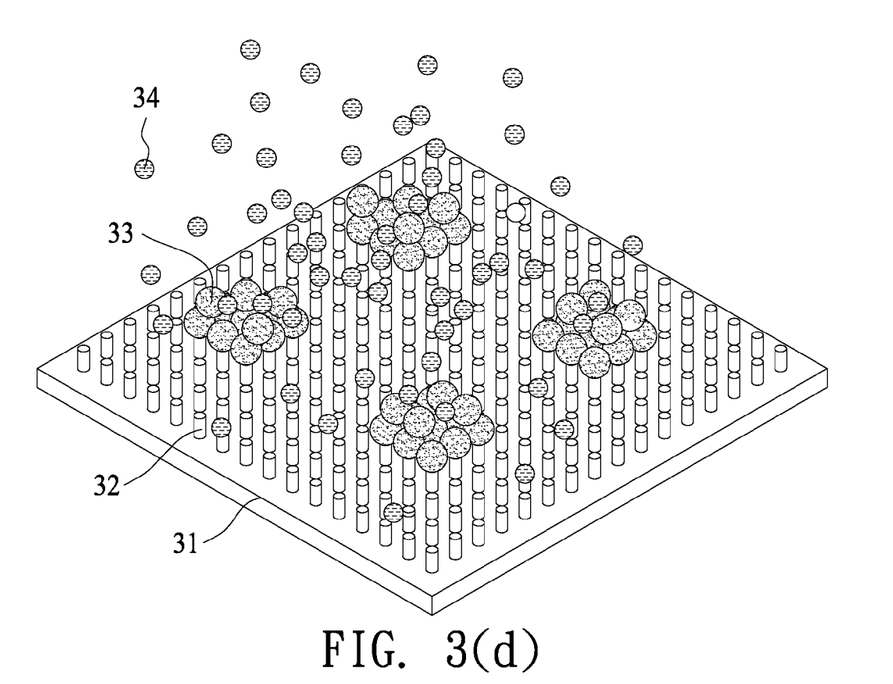
Figure 3E:
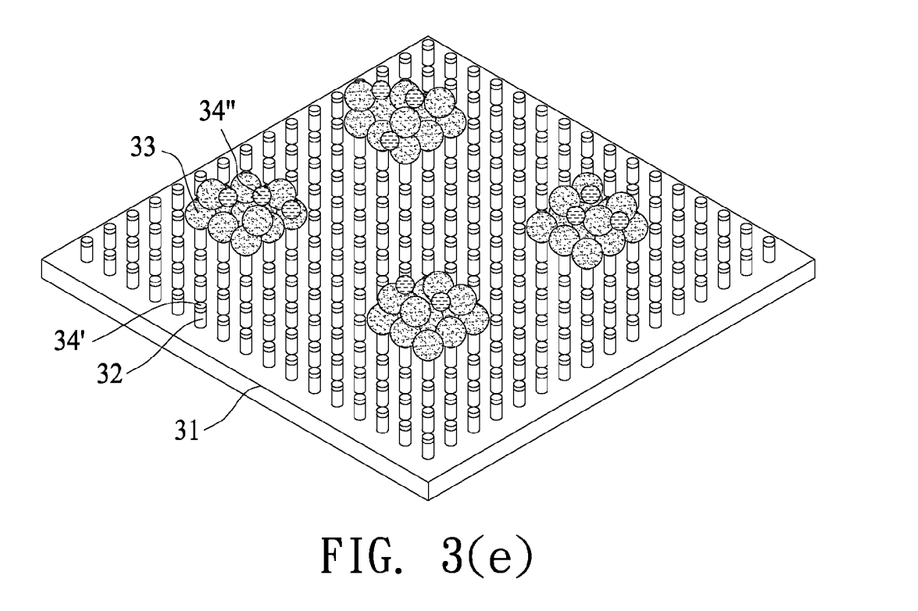
Figure 3F:
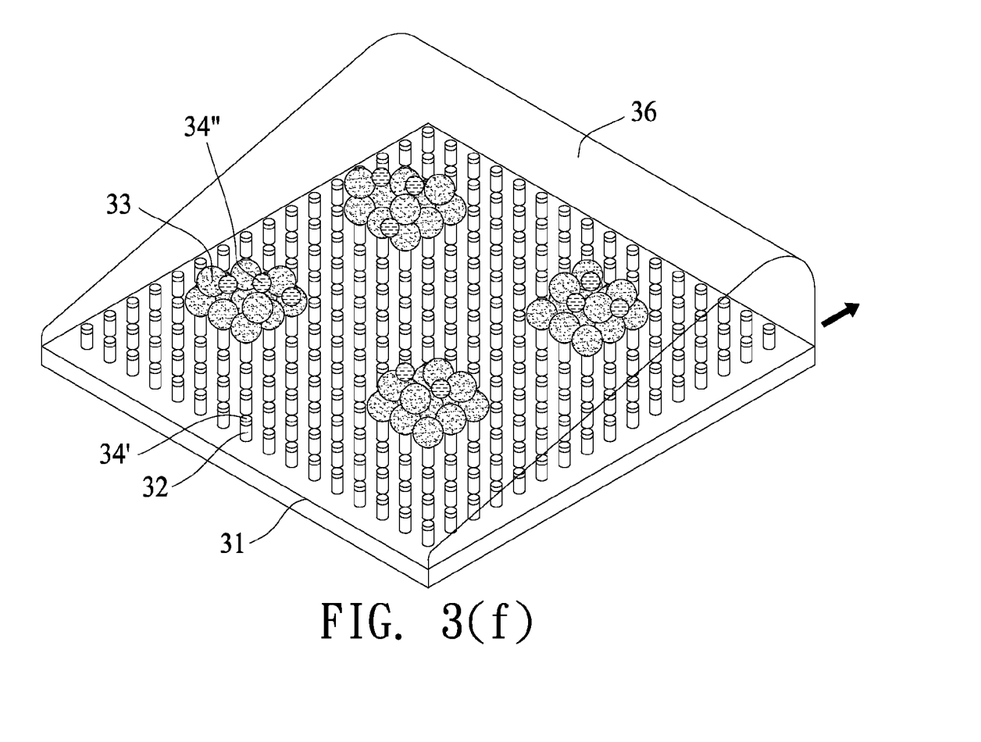
Figure 3G:
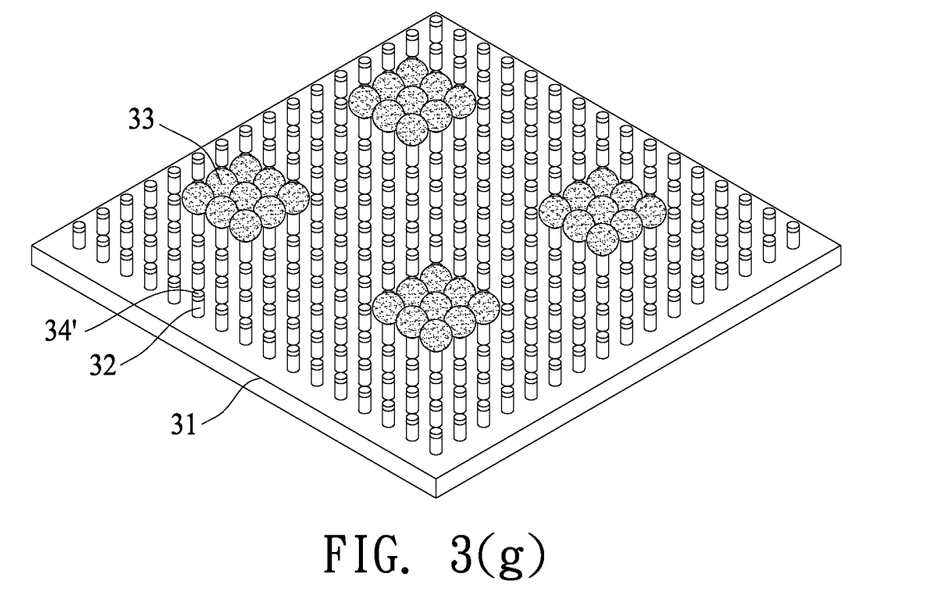
Figure 3H:
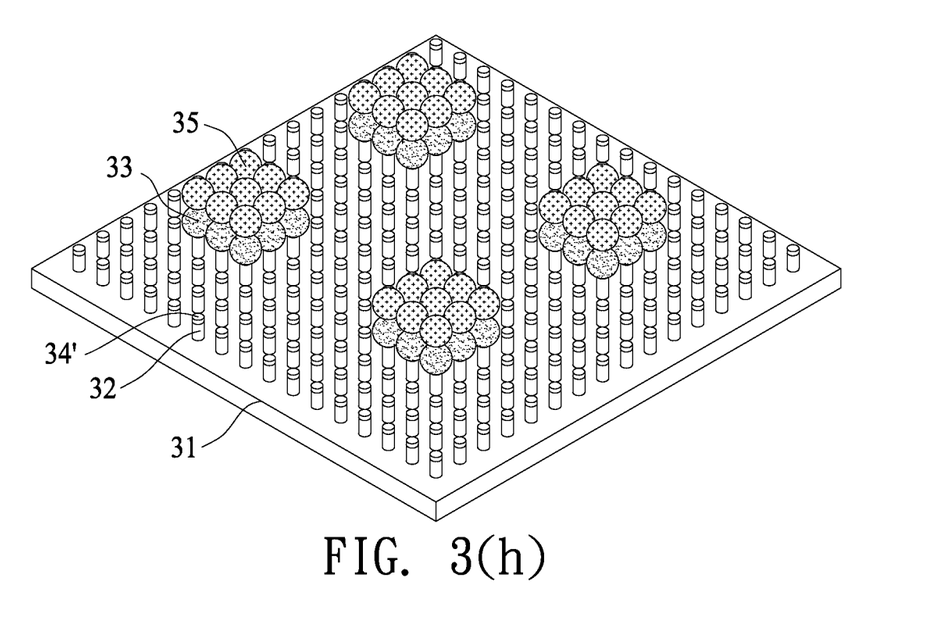

FIGS. 3(a)-3(h) are diagrams of respective steps for forming a biochip with bonding barrier by vapor deposition in accordance with the present invention. As shown in FIGS. 3(a)-3(b), a cleaned substrate 31 or a slide is soaked in a liquid to form a first self-assembled monolayer 32 thereon, for example, a (3-aminopropyl)trimethoxysilane (APTS) film. APTS has a molecular formula and a structural formula respectively expressed as follows:

molecular formula:

structural formula:

As shown in FIG. 3(c), a plurality of excess first biomedical molecule 33 points is then dropped on the first self-assembled monolayer 32 by a micropipette or a micro-droplet ejection technique. After the first biomedical molecule 33 is sufficiently bonded to the first self-assembled monolayer 32, a second self-assembled monolayer 34 is evaporated or vapor deposited on the surface of the first self-assembled monolayer 32, as shown in FIG. 3(d). The material of the second self-assembled monolayer 34 can be selected so that the second self-assembled monolayer 34 and the first self-assembled monolayer 32 can be easily adsorbed or bonded with each other. However, the material should not react with the first biomedical molecule 33, such as trichloro(1H,1H,2H,2H-perfluorooctyl)silane, with a molecular formula and a structural formula respectively expressed as follows:

molecular formula: $CF_3(CF_2)_5CH_2CH_2SiCl_3$, structural formula:

As shown in FIG. 3(e), the portions of the surface of the first self-assembled monolayer 32 on which the first biomedical molecule 33 is not dropped are processed via bonding barrier treatment with a second self-assembled monolayer 34', and a part of the second self-assembled monolayer 34" remains on the surface of the first biomedical molecular layer 33. Afterward, the second self-assembled monolayer 34" attached on the surface of the first biomedical molecular layer 33 is rinsed off by a liquid 36, and at the same time, the first biomedical molecule 33 layer that is not immobilized on the first self-assembled monolayer 32 (overlapped upper layer) is also removed, as shown in FIG. 3(f). By such a rinsing step, the points of the first biomedical molecule 33 layer immobilized on the first self-assembled monolayer 32 are exposed. Since the second self-assembled monolayer 34' and the first self-assembled monolayer 32 are adsorbed with each other, and the second self-assembled monolayer 34' cannot react with the first biomedical molecule 33 layer, after the points of the first biomedical molecule 33 layer are rinsed, no undesired phenomena such as trail or blur formation will occur, as occurs in the prior arts (seen in FIG. 3(g)). As shown in FIG. 3(h), the substrate 31 is further soaked in a second biomedical molecule 35 reagent, taken out after an appropriate reaction time, and then rinsed to remove the excess second biomedical molecule 35 on the surface of the substrate. Finally, as shown in FIG. 3(h), the second biomedical molecule 35 is immobilized at the points where the first biomedical molecule 33 layer has been titrated previously because of its identification to the first biomedical molecular layer 33. The first biomedical molecule 33 and the second biomedical molecule 35 can be proteins, genes, cells, or tissues.

According to the present invention, by vapor growing a second self-assembled monolayer 34', a bonding barrier layer is formed on the biochip, so that the disadvantages caused by the conventional bonding barrier layer formed by bioserum albumin are greatly reduced. The bonding barrier layer of the present invention has the following advantages: (1) the background noise of fluorescent labels caused by the tail and blur formation of the first biomedical molecular layer is reduced; (2) since a vacuum evaporation device is used, the steam flow is delivered effectively, so that the bonding efficiency is improved and thereby the growth time of the bonding barrier layer is shortened; (3) the binding efficiency of biomedical molecules is improved. (By using the excess first biomedical molecular layer 33 as the mask, the adsorption of the second self-assembled monolayer 34" is blocked, so that the first biomedical molecular layer 33 points to be reacted are not readily blocked by the bonding barrier layer); (4) since the vapor growth method can reduce the background value, and the excess first biomedical molecular layer 33 is used as the mask, a higher binding efficiency can be obtained, so that the signal of fluorescent labels is enhanced, and the sensitivity of the biomedical detection can be relatively increased; and (5) the test piece can be placed in an evaporation chamber in batches to grow a bonding barrier layer, thereby the bonding barrier layer of the present invention can enable batch processing.

According to the present invention, a molecule or a self-assembled monolayer's material containing carbon (C) and hydrogen (H) is used as the bonding barrier layer, which is grown on a biochip by vapor growth, so as to block non-specific binding of biomedical molecules. In addition to trichloro-(1H,1H,2H,2H-perfluorooctyl) silane, the following five non-biological (i.e. non-serum, non-milk based materials) self-assembled monolayer's materials can also be used as the bonding barrier layer:

(1) organic thiol such as alkanthiol, capable of bonding with a substrate having a surface of silver, gold, or copper;
(2) organosilicon derivatives, capable of bonding with a substrate having a surface containing a hydroxy group, such as, silicon dioxide or glass of a silicon surface, and aluminum oxide of an aluminum surface;
(3) alcohols or amines, capable of bonding with a substrate having a surface of platinum;
(4) carboxylic acids, capable of bonding with a substrate having a surface of aluminum oxide or silver;
(5) organosilicon derivatives containing Si, C, and H, capable of immobilization on a subtract having a surface with a terminal functional group of $NH_2$.

Figure 4A:
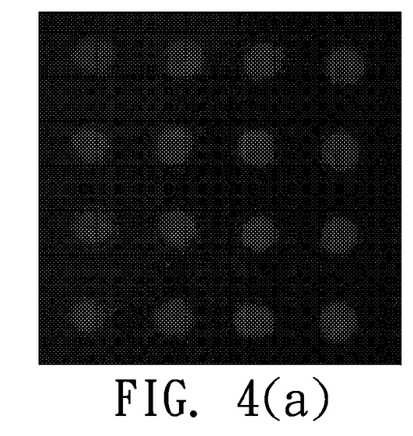
FIGS. 4(a)-4(f) are diagrams comparing the detection results of the biochips each with a bonding barrier layer formed by the prior art and with a bonding barrier layer formed according to the present invention.
Figure 4B:
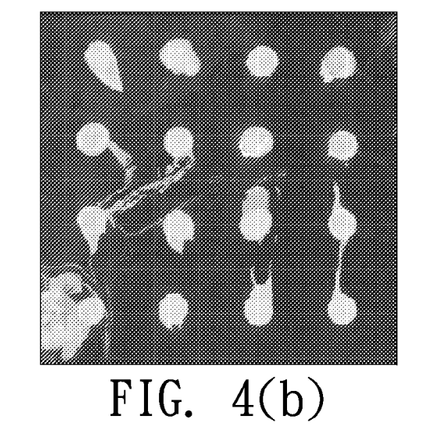
Figure 4C:
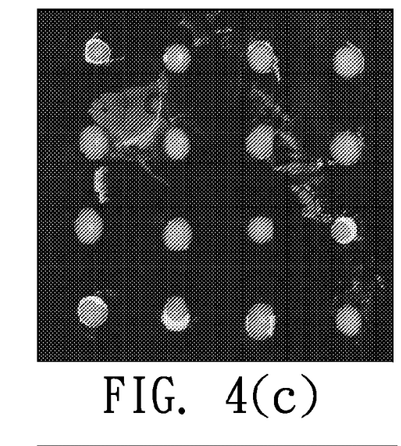
Figure 4D:
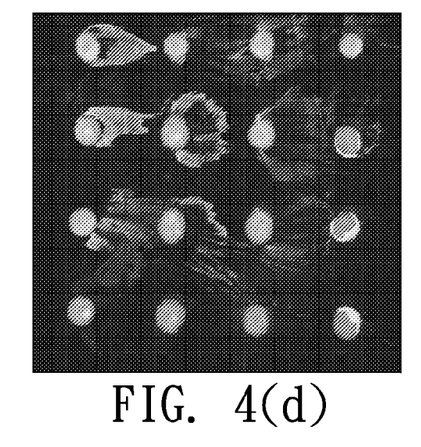
Figure 4E:
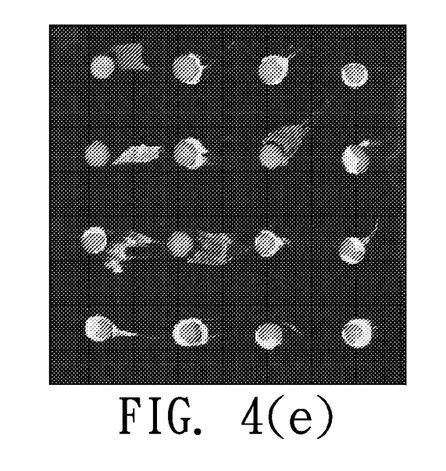
Figure 4F:
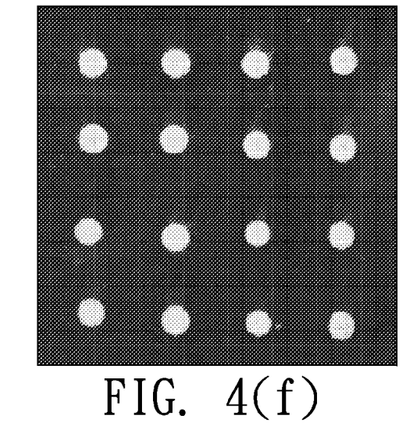

FIGS. 4(a)-4(f) are diagrams comparing the detection results of the biochips each with a bonding barrier layer formed by the prior arts and a bonding barrier layer formed according to the present invention. In order to exhibit the significant bonding barrier effects of the present invention, FIG. 4(a) selects a substrate having a blank surface without being modified by the first self-assembled monolayer (APTS) and without being processed with a molecular bonding barrier. Furthermore, FIG. 4(b) utilizes an APTS layer without being processed with a molecular bonding barrier as in the two control groups. As shown in the fluorescence scanning results in FIGS. 4(a)-4(f), it can be observed that the substrate without being modified by APTS cannot immobilize the biomedical molecule, resulting in difficulty in identifying the fluorescence signal (FIG. 4(a)). When only using the APTS without being processed with a bonding barrier, the fluorescence scanning results are poor (FIG. 4(b)), and the blur and tail phenomena occur, and the contrast of the background value and the signal is not good. The result shows that effective biochip detection cannot be achieved without bonding barrier processing. Therefore, in the conventional process, bioserum albumin is used as the bonding barrier layer, for example, horse serum albumin (HSA), milk, and bovine serum albumin (BSA). FIGS. 4(c)-(e) are the results of forming the bonding barrier layer after being soaked in the three bioserum albumin liquids for one hour, and it can be observed from the figures that the blur and tail phenomena occur in each condition. These blur and tail phenomena will result in contamination between the protein subjects on the biochip, so that the optimal detection effects cannot be achieved. Accordingly, the present invention utilizes FOTS as the bonding barrier layer to further improve the detection quality of relevant biochips. It can be observed from the detection results of the bonding barrier layer formed by FOTS in FIG. 4(f) that the blur and tail phenomenon will not occur in the biochip even when the bonding barrier processing is performed for merely five minutes, so that various disadvantages of the conventional bioserum albumin can be greatly improved upon.

Figure 5:
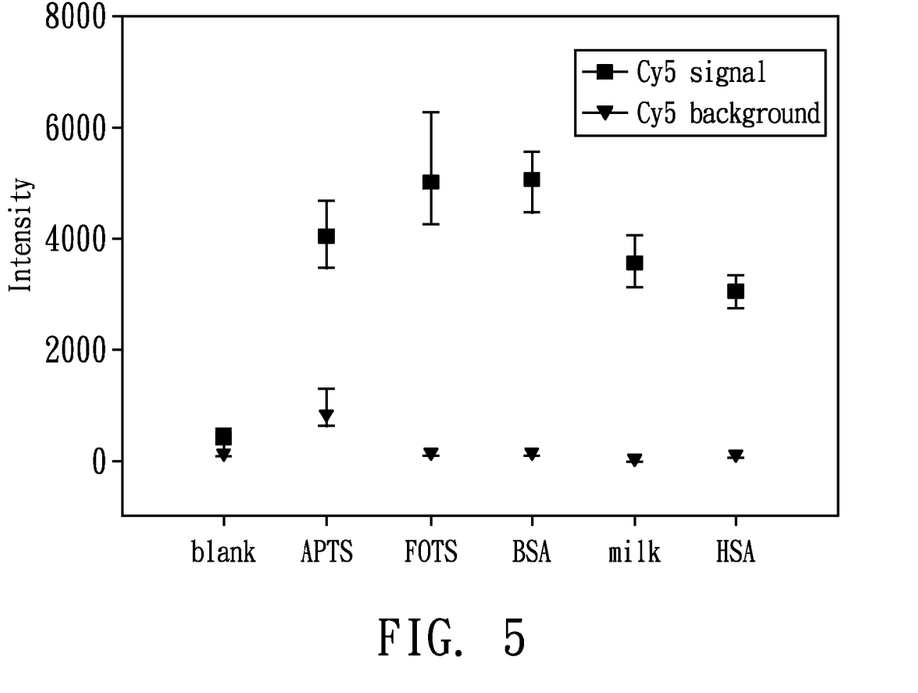
FIG. 5 is a graph showing the fluorescence signals at 16 points on each biochip in FIGS. 4(a)-4(f) versus the medians of the background values.

Again, according to the results shown in FIGS. 4(a)-4(f), the fluorescence signals and the background values of each biochip are further measured, and the efficacies of the prior arts and the present invention are compared to demonstrate the differences thereof. FIG. 5 is a graph showing the fluorescence signals at 16 points on each biochip described above versus the medians of the background values. It is known from FIG. 5 that, on the blank substrate without any processing, the Cy5 fluorescence-labeled (red) background and the signal intensity are very weak, respectively 141 and 425. By using the substrate as a control group, it can be verified that the rinsing step can wash off most of the physically adsorbed protein from the substrate. The fluorescence background and the signal intensity of the substrate modified with APTS points without any bonding barrier layers are respectively 833 and 4407, which is obviously about 6 times of the background value of the blank substrate. This high background value will lead to a great decrement in the detection sensitivity. The background values and the signal values of additional substrates using four bonding barrier layers of HSA, milk, BSA, and FOTS are 42/3558, 162/5023, 114/3046, 134/4993, respectively. Each background value above is very weak, so a higher S/N ratio can be achieved. The fluorescence scanning data of bonding barrier effect of each biochip are listed in the table below:

TABLE 1

Fluorescence scanning data of the bonding barrier effect of each biochip

| | | Control group | | Prior art | | | Present invention |
|---|---|---|---|---|---|---|---|
| | | Blank | With APTS without a bonding barrier layer | HSA | milk | BSA | FOTS |
| Signal intensity | Cy3 | 819 | 11250 | 1662 | 4215 | 3165 | 30902 |
| | Cy5 | 425 | 4047 | 3558 | 5023 | 3046 | 4993 |

TABLE 1-continued

Fluorescence scanning data of the bonding barrier effect of each biochip

| | | Control group | | Prior art | | | Present invention |
|---|---|---|---|---|---|---|---|
| | | Blank | With APTS without a bonding barrier layer | HSA | milk | BSA | FOTS |
| Background value intensity | Cy3 | 70 | 235 | 80 | 217 | 115 | 139 |
| | Cy5 | 141 | 833 | 42 | 162 | 114 | 134 |
| S/N ratio (Cy5) | | 3.0 | 4.9 | 31.0 | 25.2 | 21.6 | 35.4 |

It can be seen from Table 1 that the Cy5 S/N ratio of the blank substrate is 3.0, and the Cy5 S/N ratio of the substrate with APTS without bonding barrier is 4.9. When the S/N ratio is less than 3, the detection signals are generally considered to be unreliable. Only when the S/N ratio is greater than 5, the detection signal can be adopted. Therefore, the conventional bonding barrier material of bioserum albumin including HSA, milk, and BSA can respectively improve the S/N ratio to 31, 25.2, and 21.6. However, in the present invention, a higher S/N ratio of 35.4 can be achieved by adopting FOTS as the bonding barrier material. Though an acceptable S/N ratio can be obtained by a conventional bonding barrier material of bioserum, and can be detected on a protein biochip, the problem of halo and tail still exists. In contrast, in the present invention, a bonding barrier layer is formed by evaporation of FOTS so that, not only is a higher S/N ratio achieved, but also a better detection quality is obtained in the fluorescence detection image, and thereby the cross-contamination between various detection signal points can be effectively avoided.

The aforementioned descriptions of the present invention are intended to be illustrative only. Numerous alternative methods may be devised by persons skilled in the art without departing from the scope of the following claims.

What is claimed is:

1. A method for manufacturing a biochip, comprising:
coating a first self-assembled monolayer on a surface of a substrate;
forming a plurality of first biomedical molecular dots on the first self-assembled monolayer;
vaporously depositing a second self-assembled monolayer on the first self-assembled monolayer, wherein the second self-assembled monolayer and the first self-assembled monolayer are bound with each other; wherein each of the first biomedical molecular dots includes a first portion of the first biomedical molecules bonded to the first self-assembled monolayer and a second portion of the first biomedical molecules masking the first portion of the first biomedical molecules to block the first portion of first biomedical molecules from contacting material forming the second self-assembled monolayer; and
removing the second portion of the first biomedical molecules and the second self-assembled monolayer adhered to the excess first biomedical molecules;
wherein the second self-assembled monolayer is a trichloro(1H,1H,2H,2H-perfluorooctyl)silane film, and trichloro(1H,1H,2H,2H-perfluorooctyl)silane has a molecular formula of $CF_3(CF_2)_5CH_2CH_2SiCl_3$.

2. The method for manufacturing a biochip of claim 1, further comprising a step of immobilizing second biomedical molecules on the first biomedical molecular dots, wherein the first biomedical molecule dots and the second biomedical molecules are proteins, genes, cells, or tissues.

3. The method for manufacturing a biochip of claim 1, further comprising a step of removing non-bonded parts of the second self-assembled monolayer on the plurality of first biomedical molecular dots.

4. The method for manufacturing a biochip of claim 1, wherein the first self-assembled monolayer is a (3-aminopropyl)trimethoxysilane film, and (3-aminopropyl)trimethoxysilane has a molecular formula of $C_6H_{17}NO_3Si$.

5. The method for manufacturing a biochip of claim 1, wherein the first self-assembled monolayer is formed on the substrate surface by soakage or evaporation.

6. The method for manufacturing a biochip of claim 1, wherein the second self-assembled monolayer is deposited on the first self-assembled monolayer by evaporation.

* * * * *